United States Patent [19]

Bigler

[11] Patent Number: 5,794,980
[45] Date of Patent: Aug. 18, 1998

[54] FOLDING APPARATUS

[76] Inventor: Karen Robbins Bigler, P.O. Box 64334, Tacoma, Wash. 98464

[21] Appl. No.: 615,992

[22] Filed: Mar. 18, 1996

[51] Int. Cl.⁶ .................................................. B42D 1/00
[52] U.S. Cl. .......................... 281/2; 283/34; 446/147
[58] Field of Search ............................ 283/34, 35, 38; 446/147, 156, 152, 487; 434/346, 347, 348, 428; 273/157 R; 428/43

[56] References Cited

U.S. PATENT DOCUMENTS

| | | | |
|---|---|---|---|
| 2,915,842 | 12/1959 | Finnell | 446/147 |
| 3,145,481 | 8/1964 | Aldershof | 434/348 |
| 3,230,641 | 1/1966 | Sloves | 434/48 |
| 3,248,806 | 5/1966 | Schrader | 238/34 |
| 3,491,193 | 1/1970 | Bianchi | 434/348 |
| 3,505,746 | 4/1970 | Jackson | 434/348 |
| 5,466,503 | 11/1995 | Dischler | 428/43 |

FOREIGN PATENT DOCUMENTS

| | | | |
|---|---|---|---|
| 3528740 | 2/1987 | Germany | 283/34 |
| 1710088 | 2/1992 | U.S.S.R. | 446/147 |

*Primary Examiner*—Willmon Fridie, Jr.
*Attorney, Agent, or Firm*—Vance, Romero & Montague, P.S.

[57] ABSTRACT

Apparatus and processes for educating and entertaining persons. Said apparatus having one or more primary sheets with cuts, slits, or slots therein, through which a plurality of cards or strips are woven to form a foldable device. Said apparatus having an upper or exterior surface upon which a first indicia may be printed or appear. Said apparatus capable of folding to cause the first indicia to be covered and reveal an otherwise hidden second indicia printed or appearing thereon. Said invention further including the processes for manufacturing and using said apparatus.

21 Claims, 8 Drawing Sheets

FOLDING APPARATUS

COPYRIGHT NOTICE

© Copyright 1996, James R. Vance. All Rights Reserved.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and processes for educating and entertaining persons. More particularly, this invention relates to novelty books, cards, games, magic tricks, folding apparatus, examination and testing apparatus, educational and entertainment apparatus, and processes for the manufacture and use thereof.

BACKGROUND ART

Within the book manufacturing industry, there is a category of books titled 'novelty books.' Such 'novelty books' often incorporate the use of ingenious flaps to pull, wheels or discs to turn, peep-holes to look through, cut-outs that permit later pages to participate in the scene of a current page, and use of puppets or other toys or objects within the book.

One particularly popular type of novelty book is known as a pop-up book. It is believed that the first true pop-up book was first published in 1855 by Dean of London and was called Little Red Riding Hood. Many other publishers soon began to copy the concept under a myriad of different titles.

Thereafter a book titled Little Folks Nursery Rhymes in Moving Pictures was published which introduced the first book having a pull-tab mechanism therein.

Later, Mr. Ernest Nister produced books which used a mechanism referred to as 'dissolving pictures.' Three (3) different sheets of cardstock or heavy paper are used within each page of a 'dissolving pictures' novelty book. The first two pages are each provided with a different scene. The third page is used as a mask to cover the underlying mechanism. The two underlying pages, having the different scenes therein, are each segmented and interleaved. Consequently, when a pull-tab that is connected to the uppermost interleaved page is pulled, the scene contained thereon is pulled in a coplanar manner over the lowermost interleaved page to hide the scene contained on the lowermost page. Conversely, when the pull-tab that is connected to the uppermost interleaved page is pushed into the mechanism, the scene contained on the uppermost page is pushed behind the segments of the lowermost page and is hidden thereby.

Through a progress of time, novelty books now incorporate the use of numerous different engineering principles. For example, some pop-up books have pages wherein multiple layers of scenery lurch or pop out at the reader when the page is turned to and opened. Other pages have rotating discs, or devices that slide or pivot when a pull-tab is pulled. Some books even still use the basic principle of dissolving pictures or scenes as explained above.

Such mechanisms, however, are not limited just to books. There is an increasingly larger volume of popular gift cards that also utilize such mechanisms.

Another area of novelty books is known as the 'activity book' or 'quiet book.' Activity or quiet books are often manufactured from cloth or fabric and incorporate the use of zippers, buttons, snaps, laces, and eyes and hooks. Such books are usually used to teach very young children motor skills and manual dexterity. Other activity or quiet books have used themes related to farm animals, biblical stories, and the like.

The inventor believes that the listed devices taken alone or in combination neither anticipate nor render obvious the present invention. The foregoing explanation does not constitute an admission that such devices are relevant or material to the present Claims. Rather, the above-mentioned devices relate only to the general field of the current disclosure.

DISCLOSURE OF INVENTION

The present invention can be used to educate and entertain one or more users or readers. More particularly, the present invention includes apparatus and processes for manufacturing and using a new form of novelty book, card, game, magic trick, and/or examination and testing apparatus. The invention basically incorporates a new, simple, easily used, inexpensive folding apparatus to switch between two or more different page surfaces that seem to magically appear and disappear as the apparatus is manipulated.

The present invention is compact, efficient, reliable, reusable, durable, and rugged. The present invention requires minimal manipulation and physical dexterity to operate, and is extremely simple to use once the principle of its operation is understood. The present invention also eliminates the need for the manufacture, installation, and operation of complex mechanical mechanisms within the book or device and the purchase, manufacture, operation, and maintenance of non-standardized die cutting forms and machinery. Thus, the present invention is dramatically less expensive and more economical to manufacture, and is more easily constructed and assembled.

The present invention not only increases the speed and simplifies the procedure to manufacture educational and/or entertaining novelty books, cards, games, and the like, it also provides an unobtrusive but effective manner to conduct and grade examinations and tests. For example, the present invention could be used to ask questions on the facing page and then reveal the answer to the question on the hidden page.

The present invention can be very compact. Within the preferred embodiment, the present invention does not require the use of a large number of overlapping sheets, as is usually required to construct complex, multi-layered pop-up books. Thus, the present invention requires a minimal amount of space and can be easily carried and stored within a purse, pocket, or other storage space.

In addition to the foregoing advantages and other advantages that will be described further below, the present invention also overcomes nearly all of the disadvantages experienced with the above-mentioned prior novelty book devices.

To achieve these general and specific objectives the present invention generally comprises the combination of: (a) one or more generally planar primary sheets or mounts, each having a series of cuts, slits, or slots therein which form a plurality of panels; and (b) two or more generally planar strips of sheet material or cards that are woven or interwoven with the segmented panels through the cuts, slits, or slots to create a woven mat. Indicia is printed upon or otherwise appears on an upper and reverse sides of the primary sheet and/or the strips. Indicia is also printed upon or otherwise appears on a hidden upper side and a hidden reverse side of the primary sheet and/or the strips. During operation of the apparatus, the foregoing combination of elements are manipulated to move between a first position wherein a first indicia is available for viewing and a second position wherein a second indicia, which was otherwise hidden from view, is available for viewing. Similarly, the apparatus can be turned over and the aforementioned combination of elements can be manipulated to move between a third position wherein a third indicia is available for viewing and a fourth position wherein a fourth indicia is available for viewing.

The preferred and several alternative embodiments of the apparatus and structures of the present invention and the processes for manufacture and use thereof will be further described in greater detail in the following sections and drawings of this Specification. However, to avoid any possible confusion as to the scope of the present invention, each of the following sections and the drawings of this Specification in their entirety are incorporated herein by this reference.

The foregoing and other objectives and advantages of the present invention will become more readily apparent upon reading the following disclosure and referring to the attached drawings.

BRIEF DESCRIPTION OF DRAWINGS

FIG. 3 also illustrates confused or nonsensical patterns imprinted upon the upper side of the individual components of the apparatus when disassembled or taken apart.

FIG. 4 also illustrates confused or nonsensical patterns imprinted upon the lower side of the individual components of the apparatus when disassembled or taken apart.

FIG. 9 further illustrating insertion of the gathered or closed accordion-style second embodiment of the invention being inserted and retained within a slip cover or match-box type of housing.

Figure 1:
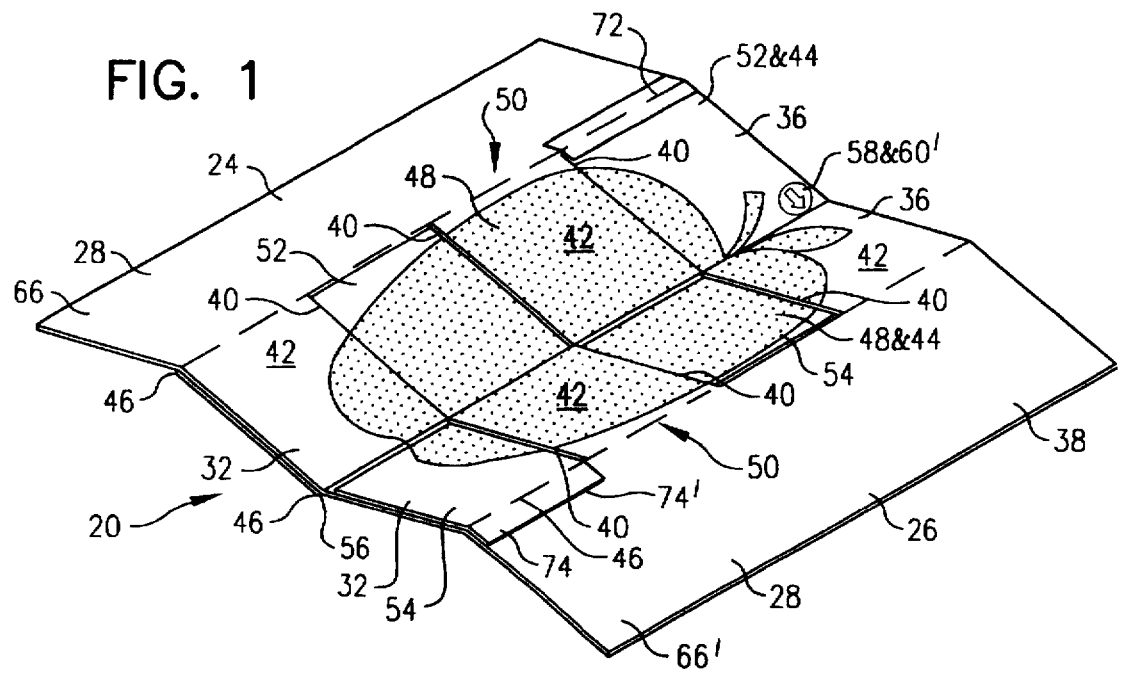
FIG. 1 is an isometric view of an upper side of a first embodiment of the present invention illustrating the combination of a primary sheet and a plurality of cards or strips to form a folding apparatus in accordance with the teachings of this disclosure. Please note that within FIG. 1, the primary sheet is shown having a partial valley fold in its approximate center. The procedure to create the central valley fold as illustrated in FIG. 1 could be continued as will be described further below to reveal a hidden surface on the lower, reverse, or under side of the combined primary sheet and plurality of cards or strips. This principle will be further discussed below.
Figure 2:
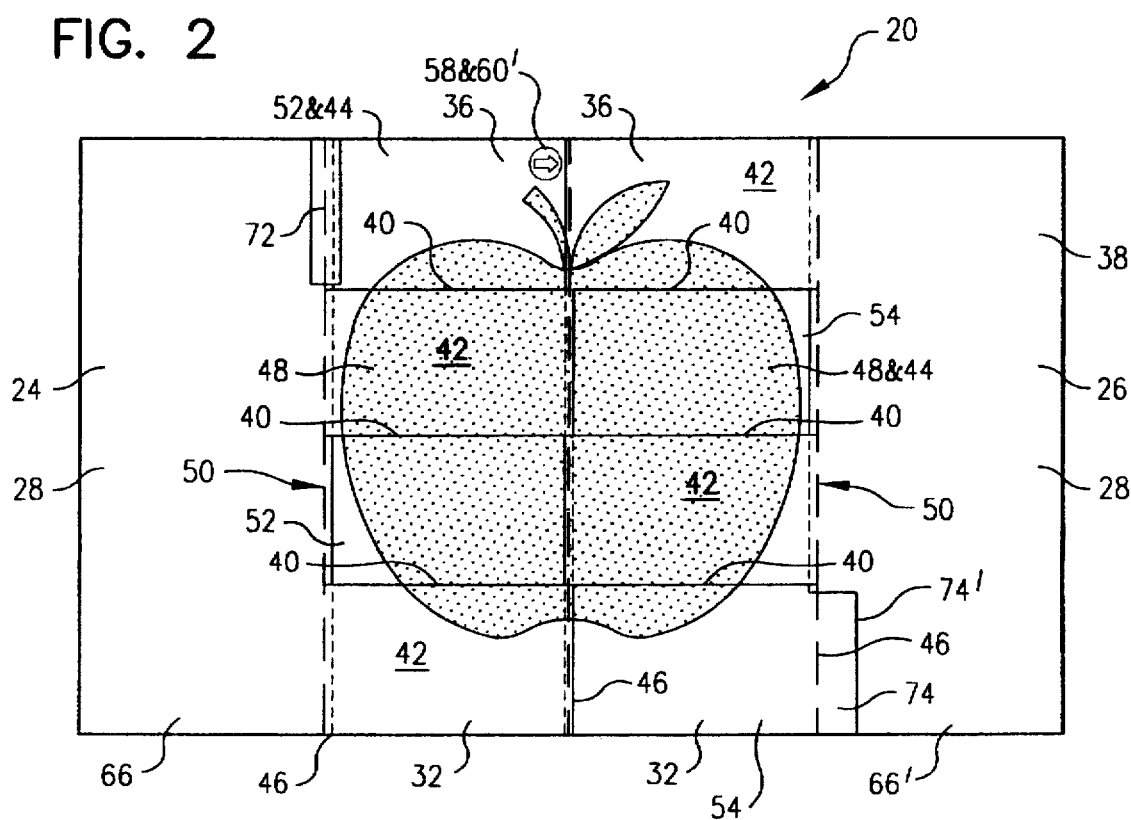
FIG. 2 is a flat, plan view of the upper side of the first embodiment of the invention as shown in FIG. 1.
Figure 3:
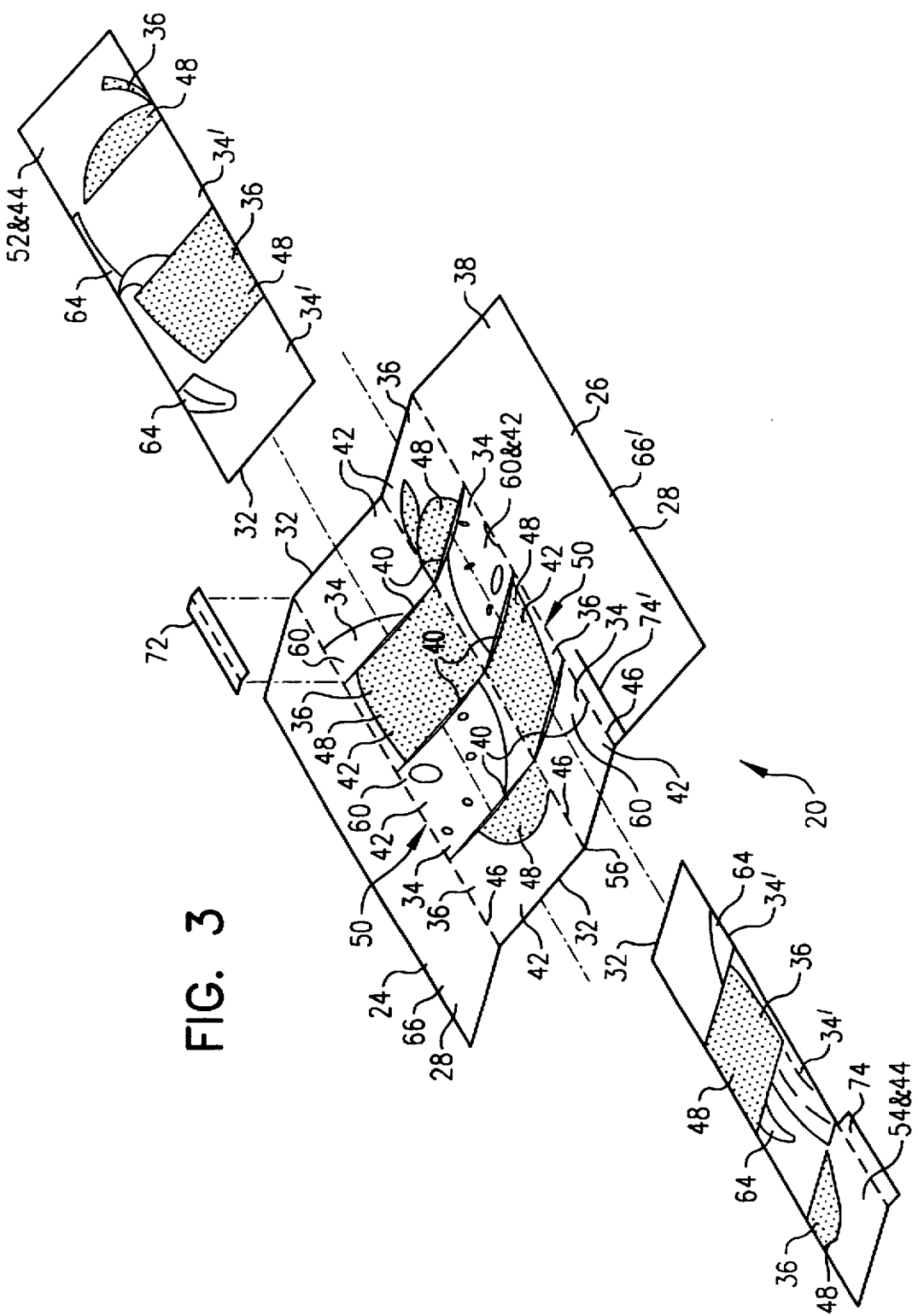
FIG. 3 is an exploded, isometric view of the upper side of the first embodiment of the invention, as shown in FIGS. 1 and 2, illustrating the interweaving of the cards or strips through cuts or slots located within the primary sheet.
Figure 4:
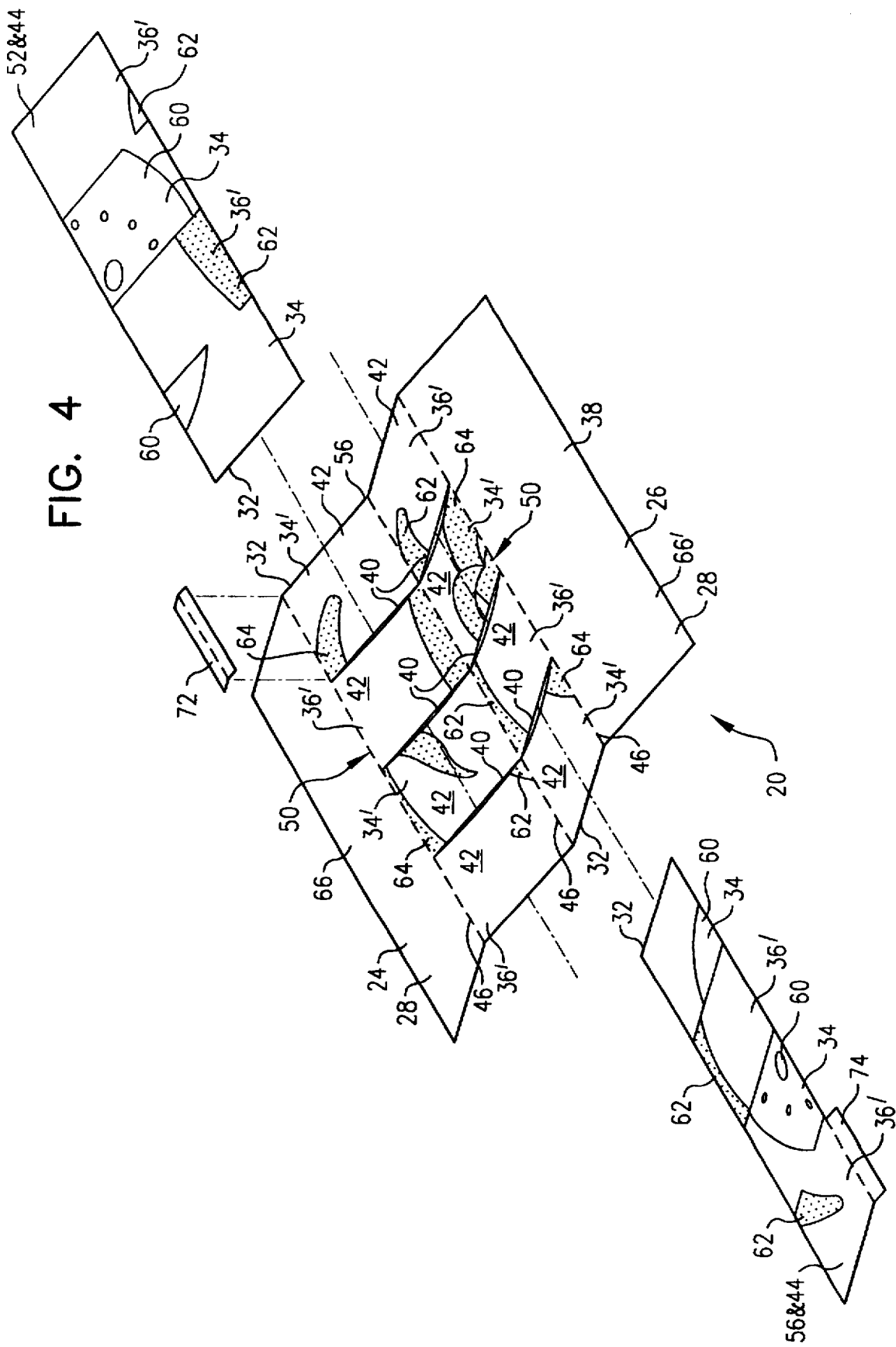
FIG. 4 is an exploded, isometric view of the lower, reverse, or under side of the first embodiment of the invention, as shown in FIGS. 1, 2, and 3, illustrating the interweaving of the cards or strips through the cuts or slots located within the primary sheet.
Figure 5:
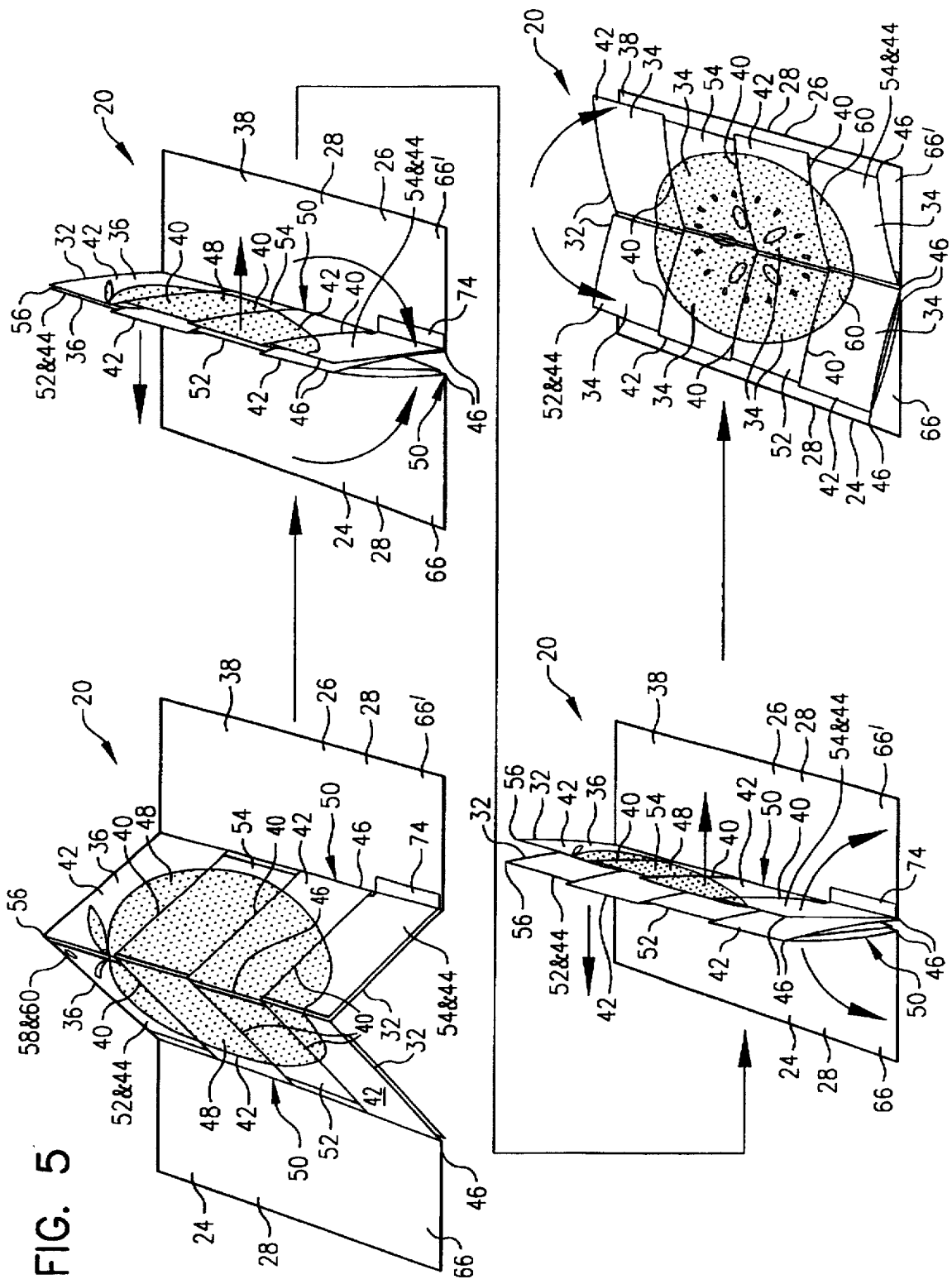
FIG. 5 is a schematic, isometric view of the first embodiment of the invention, as shown in FIGS. 1 through 4, illustrating: (a) first indicia printed or appearing upon the upper surface of the combined primary sheet and cards or strips; (b) movement of the apparatus to form a closed, portrait or landscape, mountain fold at an approximate center of the primary sheet; (c) movement or pulling apart of two distinct pages formed at the approximate center of the folded combined primary sheet and cards or strips; and (d) second indicia printed or appearing upon an otherwise hidden surface of the combined primary sheet and cards or strips.
Figure 6:
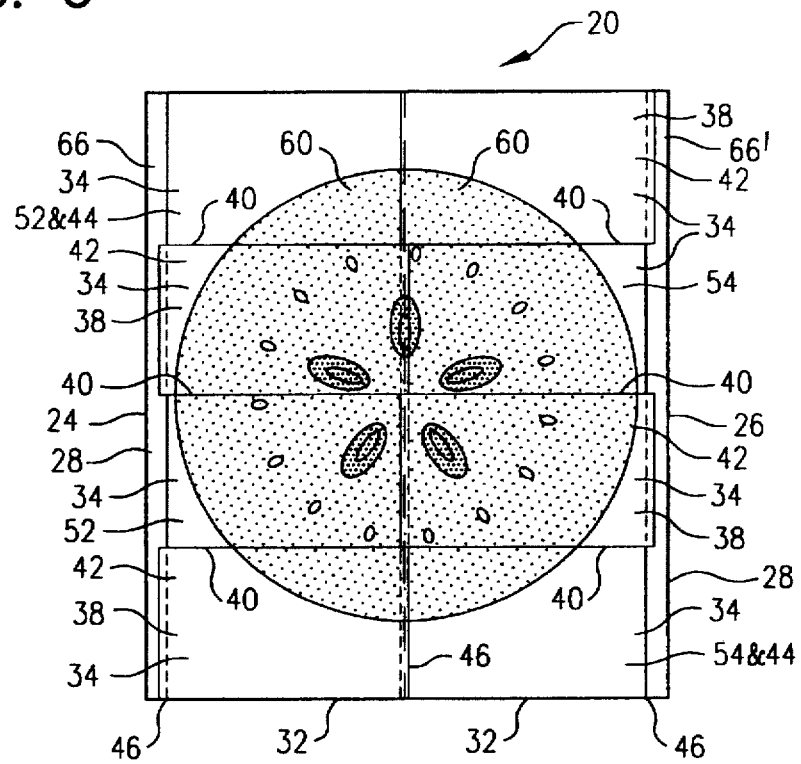
FIG. 6 is a flat plan view of the otherwise hidden surface of the upper side of the first embodiment of the invention, as shown in FIG. 5.
Figure 7:
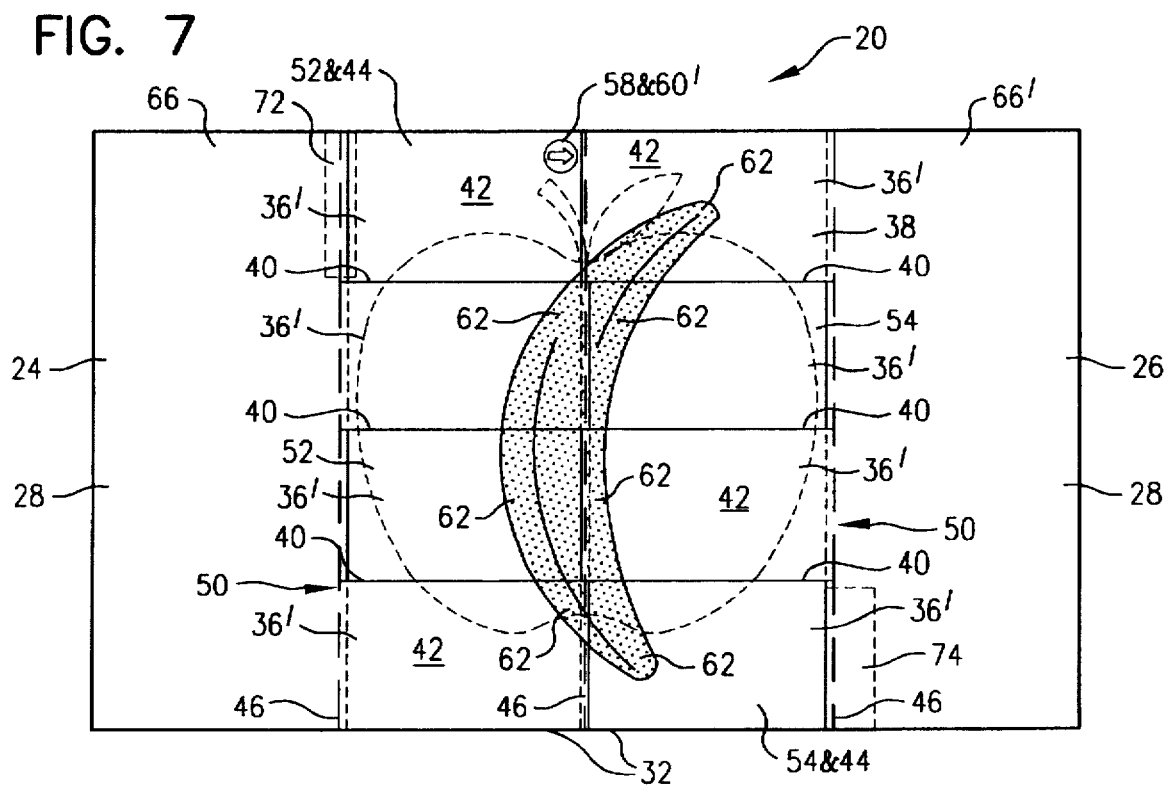
FIG. 7 is a flat plan view of a lower, reverse, or under side of the first embodiment of the invention, as shown in FIGS. 1 through 6. Please note that the indicia printed or appearing upon the lower, reverse, or under side of the combined primary sheet and cards or strips is illustrated as the outside of a banana. The apple is depicted in phantom lines to illustrate that the apple is located on the upper or opposite side, face, or surface of the apparatus.
Figure 8:
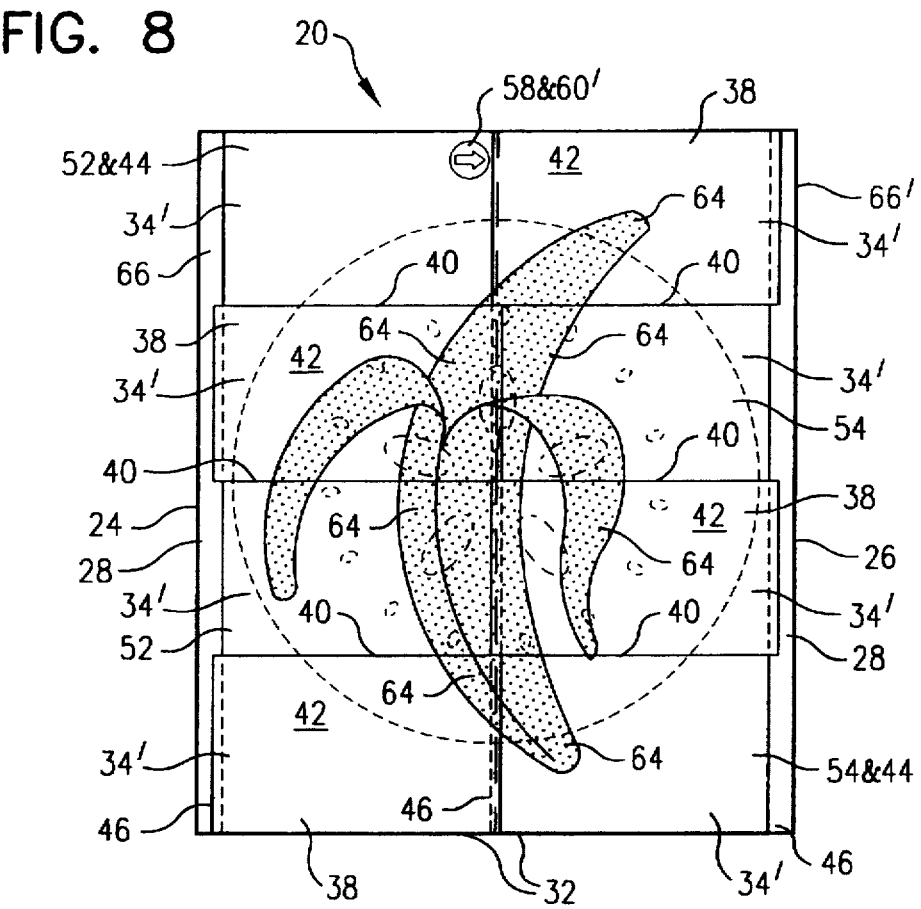
FIG. 8 is a flat plan view of the otherwise hidden surface of the lower, reverse, or under side of the first embodiment of the invention.
Figure 9:
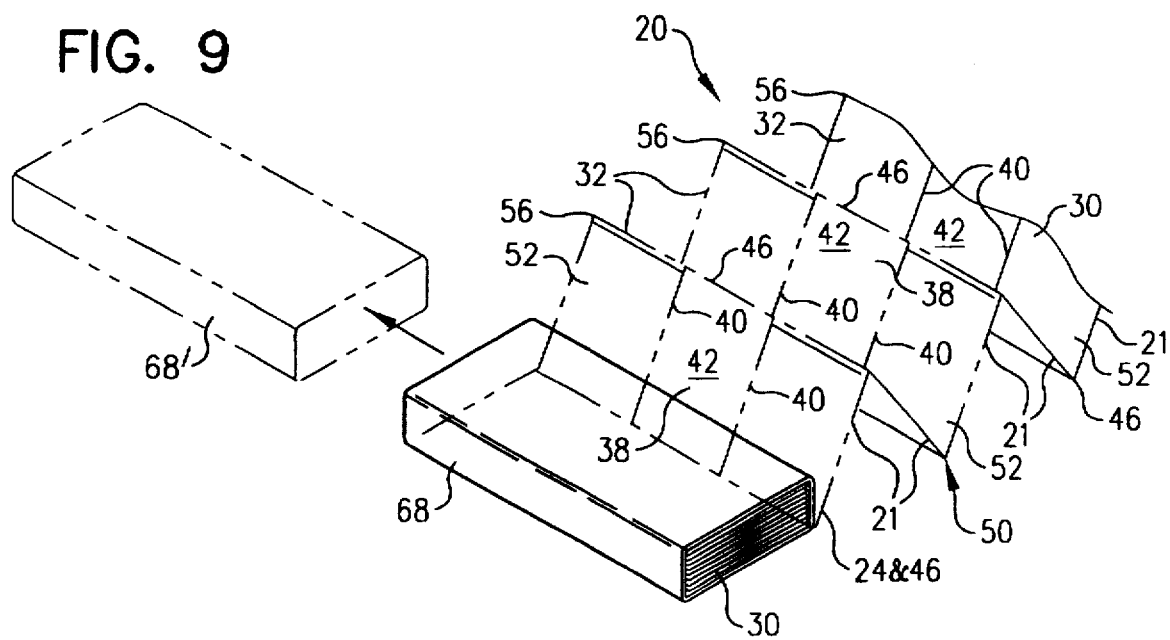
FIG. 9 is a schematic, isometric view of a second embodiment of the present invention illustrating the apparatus assuming a generally accordion-style format or appearance.
Figure 10:
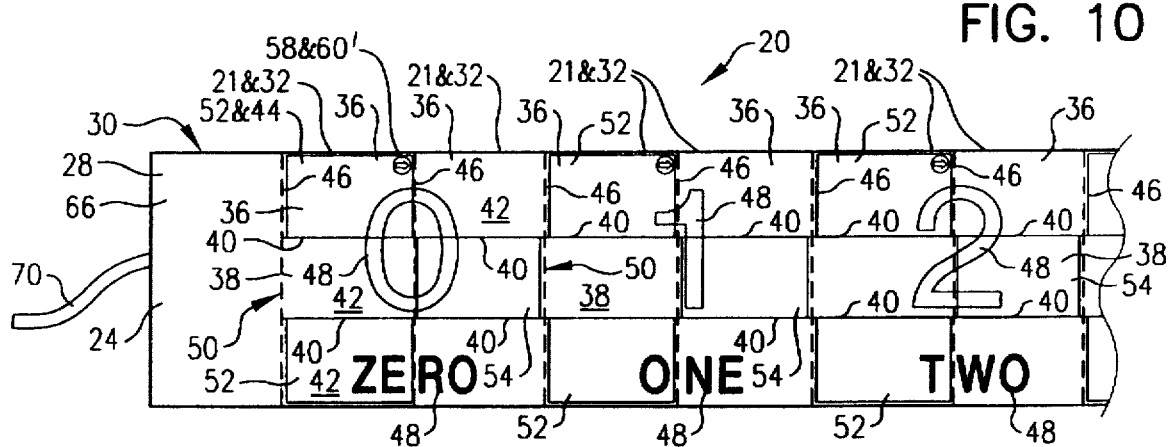
FIG. 10 is a flat, partial, plan view of the upper side of the second embodiment of the invention as shown in FIG. 9.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the drawings, wherein like numerals indicate like parts, the present invention generally comprises an apparatus 20 for educating and/or entertaining one or more users. The sophistication, interests, attention span, age, and/or other demographic criteria of the targeted end user will largely determine the subject matter and indicia that will be incorporated into or printed upon apparatus 20. For example, apparatus 20 could be used to create one or more novelty and/or activity books and/or cards for young children, such as preschool children. On the other end of the scale and for a different application, apparatus 20 could be used to maintain the confidentiality and then reveal the results of a contest, lottery offering, or the like, which would primarily be used by mature adults.

In several embodiments the apparatus 20 has a plurality of pages 21 that are bound together into a book format 22. The book format 22 may comprise a conventional book having the left side 24 or right side 26 of each page bound together to form the book 22. An excess portion 28 of paper or card stock can be left along one or more edges for binding purposes. Consequently, a series of pages can be bound along their left, top, right, or bottom edge.

Alternatively, each of the successive pages could be attached to one another to form an accordion-like or accordion-style elongated book 30.

The present invention does not simply relate to books. Rather, the invention relates to all forms of folding apparatus 20. For example, the invention could be used as a book 22 or 30, card, toy, game, magic trick, and the like. In fact, a whole new line of children's books, greeting cards, post cards, flash cards, and similar devices can be manufactured using the concepts of this invention. Such devices need not necessarily be bound to a hard or soft cover. The invention remains a folding device as taught herein, but simply takes the form of a card.

The topics that could be used with the invention are innumerable. However, by way of example and not by way of limitation, the topics used for the folding device could include: (a) preschool readiness, such as a hide-and-seek magic book, holidays, numbers, alphabet book, shapes, colors, what is inside various objects; and (b) questions and answers for examinations or flash cards. For example, the accordion-style book 30 as will be discussed further below could be used with indicia comprising numbers, the alphabet, or any other desired topic or item. One such accordion-style book 30 could use thirteen (13) different page or mat 32 segments so that the twenty-six (26) letters in the alphabet could be used thereon. Under each letter contained within the book 22 or 30, a corresponding picture that is spelled beginning with that letter sound could be hidden.

Other factors could also be used in the selection of indicia to be used with the invention. For example, selections that are phonetically correct for particular age groups may be considered in making a selection of indicia used with the apparatus 20. Thus, one book may contain preschooler's readiness topics. Another book may be used by small children, such as toddlers.

Books being constructed for use by very small children will most likely have only five (5) to seven (7) folding pages in total. It should be remembered, however, that the folding device of the present invention is not limited to any particular number of pages. Any number of desired pages or mats could be used. Similarly, books having large print or giant books could incorporate this same invention.

The illustrations used within books for young children would preferably be items that a small or young child may recognize and identify with. The indicia would preferably be very colorful to attract and retain the attention of small children.

If desired, the invention could be manufactured with different colored paper to add color without requiring the expense of procuring four color printing. Such addition of color is much more visually exciting for youngsters than simply using plain white paper.

The present invention could also be used as a magic trick or game. There is a hidden indicia 34 or 34', picture, or object on each side of the page, or on the front and the back of each page, that is not visible to the reader unless the pages are folded together and then separated at their center to find the hidden picture. The reader cannot see what is on the hidden page 34 or 34' unless the page or mat 32 is opened up in that way. The apparatus 20 in fact operates as a magic trick because the hidden picture 34 or 34' and/or answer is hidden from the immediate sight of the reader. The viewer or performer must seek the picture and/or answer by using the techniques taught herein.

Figure 11:
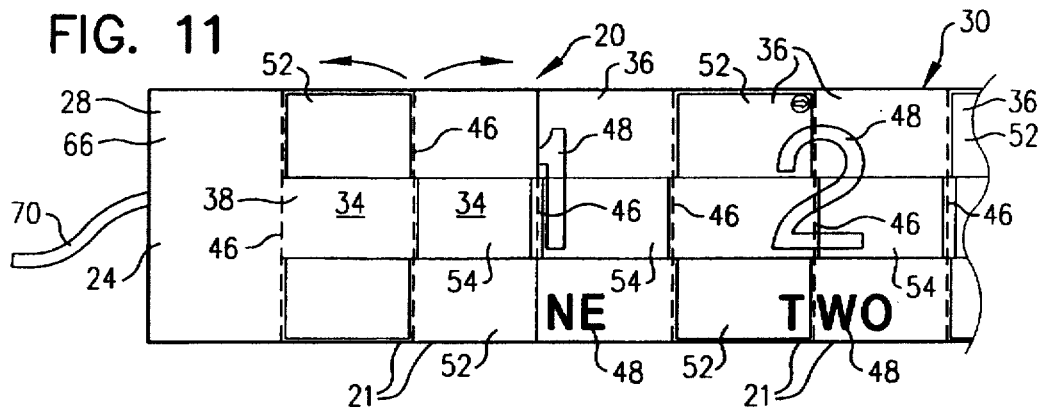
FIG. 11 is a flat, partial, plan view of an otherwise hidden surface of the first segment or page of the upper side of the second embodiment of the invention.
Figure 12:
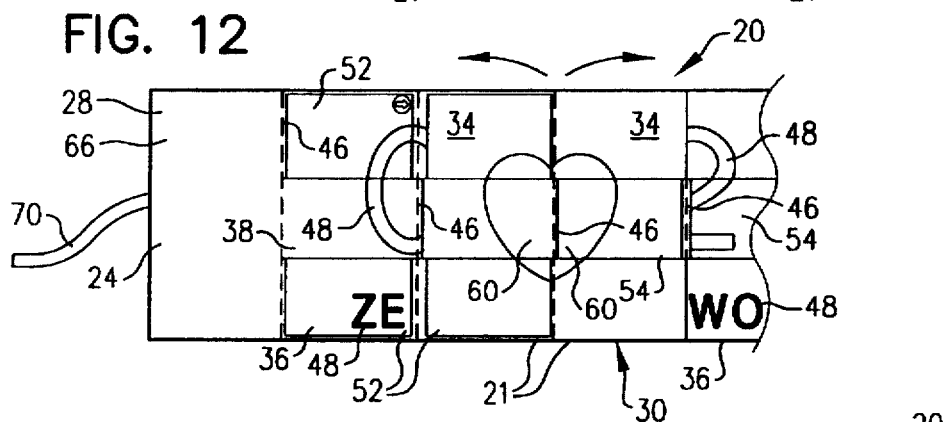
FIG. 12 is a flat, partial, plan view of an otherwise hidden surface of the second segment or page of the upper side of the second embodiment of the invention.
Figure 13:
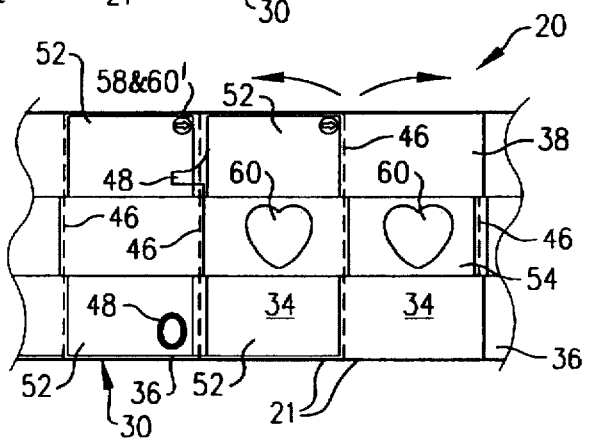
FIG. 13 is a flat, partial, plan view of an otherwise hidden surface of the third segment or page of the upper side of the second embodiment of the invention.
Figure 14:
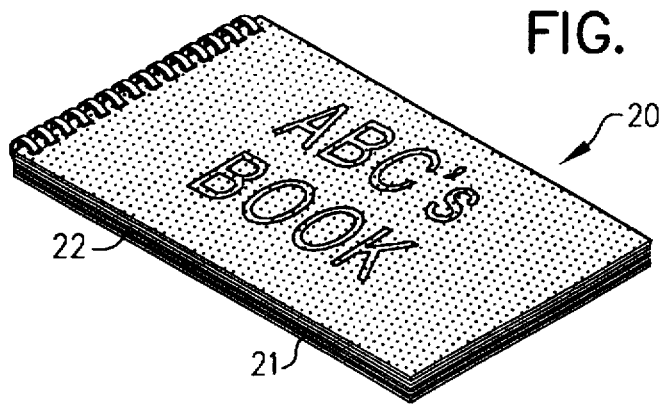
FIG. 14 is an isometric view of a third embodiment of the present invention illustrating the apparatus being bound into a book format.
Figure 15:
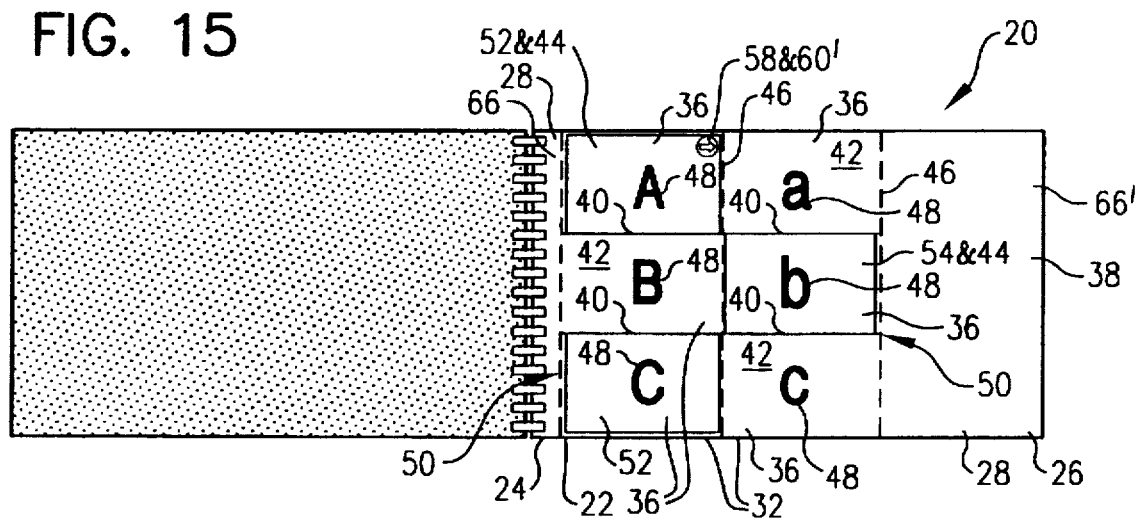
FIG. 15 is a flat, plan view of the upper side of the first page of the third embodiment of the invention.
Figure 16:
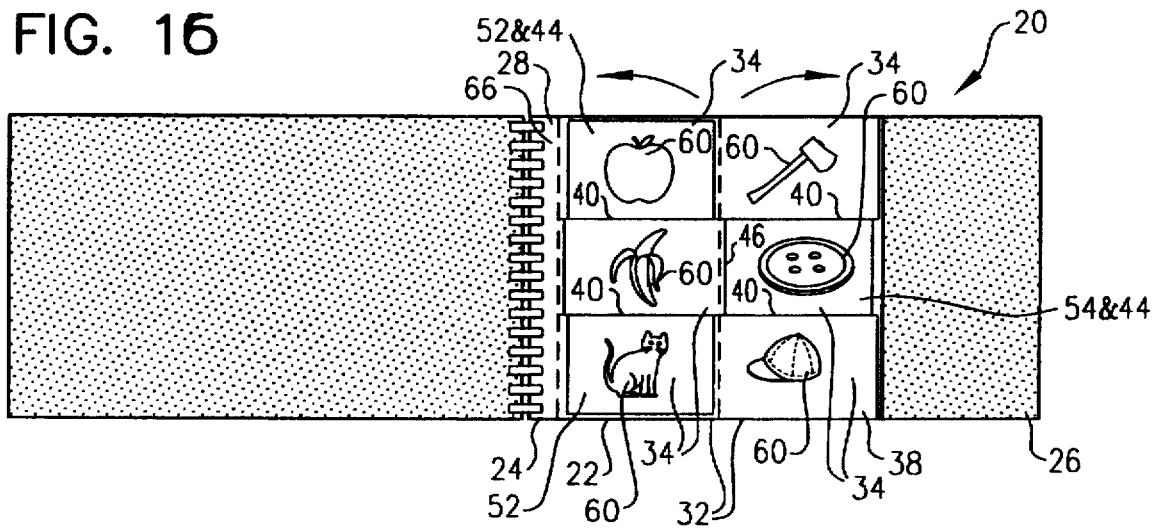
FIG. 16 is a flat plan view of the otherwise hidden surface of the upper side of the first page of the third embodiment of the invention.

Therefore, the folding apparatus 20 could be used as a teaching device to teach children numbers, number words, number values, alphabet letters, lower and upper case letters, words, nouns, verbs, shapes, colors, matching items, and the like. For example, as seen in FIG. 11, the hidden picture 34 for the numeral zero could be a blank page. Similarly, as seen in FIG. 12, the hidden picture 34 for the numeral one could be one heart. As seen in FIG. 23, the hidden picture 34 for the numeral two could be two hearts. The hidden picture 34 for the numeral three could be three balloons; four bears, five hearts, six notes, and so on. Of course, any number of type of objects could be used with the preceding example.

With reference to the hidden pictures 34 and 34' mentioned above, and as shown in FIGS. 1 through 8, inclusively, the invention could be used to show items that have an exterior and an interior, such as an apple with an outside and an inside, or a banana that is whole or peeled. Other topics could show the exterior appearance of the object on the facing page 36 or 36', and the interior appearance of the object on the hidden page 34 or 34', respectively. As shown in FIGS. 1 through 8, a whole, uneaten apple is shown on a facing page 36 and a sliced apple is shown on the inside hidden page 34. On the reverse side or page, a whole, unpeeled, uneaten banana is shown on the facing page 36'. A peeled banana is illustrated on the reverse, interior, hidden page 34'. Such drawings could be very effective, especially if the topic of the book is on foods.

Another topic could include what is inside a building. Then a school building opens up and we see a teacher and classrooms.

To achieve all of the objectives stated within this disclosure, apparatus 20 generally comprises the combination of: (a) at least one generally planar primary sheet 38 or mount that has a series of cuts 40, slits, or slots therein which form a plurality of panels 42; and (b) at least two generally planar strips 44 of sheet material or cards that are interwoven with the segmented panels 42. The indicia that is printed upon or otherwise appears upon the primary sheet 38 and/or strips 44, and the way that the combination of these elements are manipulated creates the woven mat 32 or device having an upper surface or facing page 36, a revealable hidden upper surface or page 34, a lower surface or facing page 36', and a revealable hidden lower surface or page 34'.

The primary sheet 38 has an upper side or facing page 36 and a reverse side or facing page 36'. The primary sheet 38 has a plurality of cuts 40, slits, or slots therein. Such cuts 40, slits, or slots segment at least a portion of the primary sheet 38 into a plurality of different panels 42.

The number of segments or panels 42 that are used within the apparatus 20 can vary depending upon the size and topic that is being covered. For example, a book 22 or 30 could be provided with primary sheets 38 that are divided, cut, segmented, or slotted into three, four, five, six, seven, or more panels 42. A three panel 42 woven structure will provide a mat 32 having nine square or rectangles thereon.

The combination of the panels 42 generally define a warp as that term is broadly used within the weaving technology. Similarly, each of the strips 44 generally define a weft as that term is broadly used within the weaving technology.

Each strip 44 has a portion which contributes to the upper side or facing page 36 and a reverse side or facing page 36' that correspond to similarly termed sides of the primary sheet 38.

In essence, the strips 44 are woven or interwoven through the cuts 40, slits, or slots positioned within the primary sheet 38 between, over, and under successive adjacent panels 42 in a traditional weaving manner or pattern.

The strips 44 or cards could be woven with the panels 42 using either machinery or hand manipulation. Even though the present invention will require additional steps or procedures in its construction as compared to a traditional children's book, the present invention is very simple when compared to the extremely complex pop-out books currently being marketed.

Furthermore, whereas within commercially available pop-up books each individual page is generally unique from all of the other pages within the book, the mechanisms or procedures used within the present invention can be standardized for each page 36, 36', 34, and 34' within the book 22 or 30. Only the printing on each panel 42, and/or strip 44 would be different.

The plurality of panels 42 also have creases 46, folds, or pleats therein. Such creases 46, folds, or pleats are positioned between adjacent strips 44.

The woven combination of the primary sheet 38 and the strips 44 generally defines the woven mat 32. The woven mat 32 has an upper side or facing page 36 and a reverse side or facing page 36'. The upper side or facing page 36 of the mat 32 forms a first upper surface. The reverse side or facing page 36' of the mat 32 forms a first reverse surface. The importance of these sides and/or surfaces will be explained shortly.

A first indicia 48 is printed or appears upon the first upper side or facing page 36 of the primary sheet 38 and/or upon the upper side or facing page 36 of one or more of the strips 44. It is the intention of the inventor that the first indicia 48 form a message or object that is perceptible by the user. In essence, the first indicia 48 is printed or appears upon the first upper surface or facing page 36 of the mat 32.

When the apparatus 20 is initially used, it assumes a first position wherein the mat 32 is in a generally planar form, such as flat upon a table with the first upper surface or facing page 36 thereof facing upwardly toward the user.

The mat 32 can then be manipulated by the user by pushing the two outermost side edges 50 of the mat 32 toward each other to form a generally raised and eventually closed mountain fold on the upper side or facing page 36 of the mat 32. Please note that the mountain fold will occur between two immediately adjacent strips 52 and 54.

At this point in the procedure an interesting thing occurs or happens to the apparatus 20. The raised mountain fold, and, more particularly, the adjacent strips 52 and 54 can be pulled apart or separated at or near an apex 56 of the mountain fold on the first upper side or facing page 36 of the mat 32. The interwoven panels 42 serve to retain and hold the strips 52 and 54 as they are separated and turned outwardly and downwardly to reveal the hidden upper side 34 of the mat 32. Please note that the hidden upper side 34 of the mat 32 was not readily viewable to the user unless the apparatus 20 is manipulated in the foregoing manner.

Within the preferred embodiment of the invention, appropriate markers or indicia, such as an icon 58, sticker, or mascot can be used to identify the proper location for children to open the raised mountain fold to see the second indicia 60 contained on the hidden page 34. The initial prototype of the invention used adhesive stickers as indicia on each facing and hidden page 36 and 34. However, it is anticipated that when the folding apparatus 20 is commercially produced, such indicia will be printed on each of such pages 36, 34, 36', and 34'.

If desired, a small ear or tab 60' could be provided which would assist the child to raise the page into an active or opened position.

An appropriate explanation or description of how to use the apparatus 20 could include the statements:

To find the answer and the hidden picture inside the page, simply find the mascot at the top or bottom of the page. The mascot will always give you a clue as to where to fold the pages. Now take both of your hands and fold the paper upward, making a rooftop with the mascot at the top of the fold. Move your hands to the middle of the page and take both thumbs to pull the pages apart. Congratulations! You have found the answer to the hidden surprise/picture.

In essence, a child user simply turns to a marker, sticker, icon 58, mascot, or to a little tab 60'. The child then pushes the flat page or mat 32 upward and together to form a raised tepee or mountain fold until the two halves of the mat 32 are juxtaposed flat against each other in a generally vertical plane. Thereafter, the child separates the two strips 52 and 54 to split or segment the mat 32 to reveal the hidden message 34 or object of the second indicia 60. Such message or object is hidden and undecernable until the mat 32 is opened as taught herein. The symbol, object, icon 58, or mascot is used to show the user where to flip up or fold the pages or mat 32, and where to open the strips 52 and 54 and reveal the hidden second indicia 60, containing an icon, picture, object, or prize.

A second indicia 60 is printed or appears upon the hidden upper side 34 of the mat 32. Thus, the second indicia 60 is generally hidden from the view of the user when the mat 32 does not assume or form such a closed mountain fold on the first upper side 36 of the mat 32 and/or the adjacent strips 52 and 54 are separated to reveal the hidden upper side 34 of the mat 32.

One of the significant features of the present invention is that the upper side 36 and the reverse side 36' of the apparatus 20 can be operated in a similar manner. Thus, the hidden pages 34 and 34' can be hidden and revealed from both the front or upper facing page 36 and from the reverse or back facing page 36' by manipulating either or both the upper or front facing page 36 and/or the reverse or back facing page 36'.

A third indicia 62 can be printed or appear upon the reverse side 36' of the primary sheet 38 and/or upon the reverse side 36' of one or more of the strips 52 and/or 54. If such printing is properly done, the third indicia 62 forms a message or object upon the reverse surface or page 36' of the mat 32.

When the apparatus 20 is used with the reverse side facing 36' upwardly, the mat 32 initially assumes a first position wherein the mat 32 is in a generally planar form similar to the description above. The first reverse surface 36' thereof faces upwardly toward the user.

The mat 32 can then be manipulated by the user by pushing the two outermost side edges 50 of the mat 32 toward each other to form a generally raised and eventually closed mountain fold on the reverse side of the mat 32. Please note that the mountain fold will occur between two immediately adjacent strips 52 and 54.

The raised mountain fold, and, more particularly, the raised adjacent strips 52 and 54 can then be pulled apart or separated at or near an apex 56 of the mountain fold on the first reverse side 36' of the mat 32.

The interwoven panels 42 serve to retain and hold the raised strips 52 and 54 as they are separated and turned outwardly and downwardly to reveal a hidden reverse side 34' of the mat 32. Please note that the hidden reverse side 34' of the mat 32 was not readily viewable to the user unless the apparatus 20 is manipulated in the foregoing manner.

A fourth indicia 64 is printed or appears upon the hidden reverse side 34' of the mat 32. Thus, the fourth indicia 64 is generally hidden from the view of the user when the mat 32 does not assume or form such a closed mountain fold on the first reverse side 36' of the mat 32 and/or the adjacent strips 52 and 54 are separated to reveal the hidden reverse side 34' of the mat 32.

Please note that the orientation of the cuts 40, slits, and/or slots is not necessarily crucial, just as long as they are generally symmetrical to its mating pair. Thus, the mat is capable of assuming or forming a closed portrait, landscape, or unusually oriented mountain fold format between the adjacent strips 52 and 54 without departing from the general principles of the present invention.

The apparatus 20 of this invention could also be turned sideways so that the pages or mats 32 are opened on a generally horizontal and/or vertical plane. In other words, the invention could be used to manufacture vertical style books.

The foregoing explanation teaches the basic premise of the present invention. However, many additional features could be added or incorporated into the apparatus 20. For example, the primary sheet 38 could be provided with at least one selvage 66 that is formed integrally with or secured to the warp.

The terms 'selvage,' 'warp,' and 'weft' are borrowed from the textile weaving technology and terminology. In essence, a 'selvage' is an edge of a woven article or device that is finished to prevent raveling and is generally different or distinguished from the main portion of the woven article or device. Another way to describe 'selvage' as used herein is that it represents a strip or part of surplus material that is attached to or formed integrally with the ends of the warp or panels.

Within the preferred embodiment of the invention, the selvage 66 takes the form of a portion of the primary sheet 38 that has not been cut, slit, or slotted to form the panels 42. Therefore, the selvage 66 holds one or more of the terminal ends of the panels 42 together.

To further enhance the smooth operation of the present invention, the inventor prefers to provide one or more creases 46, folds, or pleats within the primary sheet 38 between the selvage 66 and an immediately adjacent strip 52.

If desired, a plurality of mats 32 can be gathered together and placed upon or juxtaposed against one another to generally form a card, booklet, or book 22 or 30 having several pages therein. Thus positioned, the matching or corresponding selvage 66 of each mat 32 or page can be bound together to form the desired card, booklet, or book 22 and 30. Any conventional or nonconventional method of binding such mats 32 or pages can be used to accomplish this purpose.

The preferred manner for binding the pages is to use a spiral binding or a series of O-rings to permit the pages to lay flat and provide the necessary strength at the back of the cover.

Within the preferred embodiment of the invention, each primary sheet 38 is provided with: (a) a first selvage 66 that is formed integrally with or is secured to a first end of the warp; and (b) a second selvage 66' that is formed integrally with or is secured to a second end of the warp. If desired the first selvage 66 and/or the second selvage 66' may be used to contain additional indicia, instructions, and/or other material thereon. Even though the incorporation of the first selvage 66 and the second selvage 66' increase the amount of materials used to manufacture the apparatus 20, it may be easier for very small children to grasp the apparatus 20 and the concepts taught therein when such additional elements are used.

Within an alternative embodiment of the invention, a plurality of mats 32 are either formed integrally together or are joined together to form an accordion-style card, booklet, or book 30. This embodiment is illustrated within FIGS. 9 through 13, inclusively. The accordion pleats also impart a more rigid structure to the apparatus 20 during the folding process. The width of the folds or pleats can be altered or varied to create different visual impacts.

If desired, the accordion-style card, booklet, or book 30 can be provided with a slip cover 68 into which the apparatus 20 may be inserted for storage. If the containment means comprises a slip cover 68, the slip cover 68 or case does not have to have ends therein. The apparatus 20 just pulls out of the slip cover 68 or case.

Similarly, the accordion-style card, booklet, or book 30 can be provided with a match-box style storage box 68' into which the card, booklet, or book 30 may be inserted for storage. In other words, the elongated accordion-like version of the invention can be contained within a matchbox-like container or within a tubular cover or holder. Within the match-box embodiment of the invention, however, an outer box is provided and a drawer having ends thereon that pulls out will be insertable into the outer slip case or outer box.

Alternatively, the accordion-style card, booklet, or book can be provided with other means for selectively securing it in a closed position. For example, such securing means may comprise one or more ties 70, snaps, magnets, hook and loop fasteners, and/or other fastening apparatus 20 or devices. One or both terminal end pages of the accordion-like version of the invention could be provided with one or more of such fasteners to permit the book to be folded together and secured from unfolding or unraveling.

By using such a containment means, the apparatus 20 could be easily withdrawn from the matchbox-like container, tubular cover or holder, or unfastened from its attachment means when used. However, when not in use, the invention could be easily stored within the containment means and held within a purse, glove compartment in a car, within a backpack, or the like.

If desired, the strips 44 may be secured within their interwoven position or state, and thereby prevent the strips 44 from falling out of the apparatus 20, the strips 44 can be operatively secured to the immediately adjacent selvage 66 or 66'. For example, the strips 44 could be operatively secured to the selvage 66 or 66' by means of applying one or more segments of adhesive tape 72 thereto, overlapping both an outside edge of the strip 44 and the adjacent edge of the selvage 66 or 66'.

Alternatively, the strips 44 may be provided with one or more tabs 74 or ears that are operatively secured to the selvage 66 or 66'. Again, adhesive tape may be used to accomplish this task. Similarly, adhesive, magnetism, hook and looper fasteners, snaps, staples, stitching, or engagement of the tab 74 or ear into and through a corresponding receiving slot 74' could be used to accomplish this task.

The strips 44 are preferably secured in place by sewing a tab 74 thereof to the primary sheet 38 or page structure. Alternatively, transparent, translucent, and/or opaque adhesive or adhesive tape 72 could be used to accomplish this task. An adhesive would be placed on the back of the tab 74 to secure it down to the primary sheet 38. The tab 74 or tape 72 provide a flexible connection which is aligned with the outside fold or crease.

The strips 44 or cards can be secured basically anywhere on the outside fold or crease. However, the attachment should not occur on either the top, bottom, or inside of the strip 44 or the mat 32 will not fold out properly.

The tab 74 or ear could be created during the die cut phase or procedure in the manufacture of the book 22 and/or 30. An adhesive could then be applied to the ear or tab 74 to secure the strip 44 to the primary page 38.

The following are other alternatives for securing the strips 44 or cards against loss or undesired movement. A slot 74' could be provided within the primary sheet 38 or paper near the outside fold into which an outwardly projecting tab 74 on the card can be inserted. The tab 74 could also be provided with flanges that could be folded upon each other for insertion into the slot 74' and then the flanges could be spread apart to retain the tab 74 within the slot 74'.

Another alternative means for securing the strips 44 or cards against loss or undesired movement is to apply one or more segments of VELCRO®, adhesive strips, and/or magnetic strips to the tab 74 and/or to the primary sheet 38.

By utilizing the methods and apparatus 20 discussed in the immediately preceding paragraphs, the book 22 and/or 30 could be manufactured in a traditional manner without having to weave the cards or strips 44 into the primary sheet 38. Instructions and appropriate identification for proper placement of the strips 44 or cards could be provided to the end user who would weave the strips 44 into place as an additional activity that the book 22 or 30 would provide to the user as a form of entertainment and education.

Initially, one might think that it would be important to secure the strips 44 in their proper positions and prevent their escape therefrom. Upon further consideration, there are many instances wherein it would be desirable to remove and reinsert the strips 44 as part of the learning activity. In essence, the insertion or weaving of the strips 44 around the panels 42 could serve as a puzzle activity for children and/or adults. This is particularly true when the indicia included thereon may produce different ultimate results, as found on some commercially available mix and match activity books. Similarly, one might desire to remove and replace the strips in an effort to achieve a singular, yet difficult, pattern or objective.

The book 22 or 30 could even incorporate one or more primary sheets 38 and associated strips 44 or cards that are blank. The end user could then draw their own pictures or indicia on both the primary picture and hidden picture thereby further requiring creativity and drawing skills on the part of the user. The primary sheets 38 and strips 44 or cards could even be laminated or otherwise protected to enable the pictures or indicia that is applied thereto by the user to be applied and removed repeatedly.

Within an alternative embodiment of the invention, the apparatus 20 may be provided with means for initially and temporarily securing the apparatus 20 in its first or initial position and thereby maintain the secrecy of the contents of the second indicia 60 until the apparatus 20 is moved to its second and/or third positions as taught above. For example, if the present invention was used to announce whether or not the user was a winner of a prize or lottery winning, the apparatus 20 could be placed within an outer envelope. Alternatively, an adhesive, such as rubber cement, could be applied to the apparatus 20 to maintain the secrecy of the hidden surfaces until the apparatus 20 is opened as taught herein.

The invention could be manufactured with the same or different grades of paper weight. It is preferable, however, that a heavier or stiffer grade paper or card stock be used on children's books to provide structural durability and sturdiness for use by little children. When used in a children's book, the book should be sturdy enough to not tear but still allow folding by a child. In addition, a heavier grade paper or cardstock should be able to accommodate a great number of folds as required within the present invention. The inventor anticipates that books created using this invention will be manufactured from heavier weight paper to provide durability.

The size of the primary sheets 38 and strips 44 is very much a choice that is dependent upon the item or topic being treated within the book 22 or 30. Therefore, the size of paper used is up to the discretion of the author and/or manufacturer.

The means and construction disclosed herein are by way of example and comprise primarily the preferred and several alternative forms of putting the invention into effect. Although the drawings depict preferred and alternative embodiments of the invention, other embodiments are described within the preceding and following text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the Claims, appropriately interpreted under the Doctrine of Equivalents.

INDUSTRIAL APPLICABILITY

The present invention may be used to manufacture a wide variety of different products, including, but not limited to, novelty books, activity books, children books, advent book, training manuals, examination and testing apparatus, greeting cards, birthday cards, friendship cards, Christmas cards, thank-you cards, magic tricks, games, educational teaching aids, advertisements, promotional brochures and pamphlets, prize cards, lottery tickets, awards, and the like. In essence, the present invention may be used wherever simple, reliable, easily used apparatus and processes are needed to provide an outer surface having readily viewable indicia thereupon and a hidden surface that can be accessed and viewed by manipulating the apparatus as taught herein. The size, length, and width of the apparatus may also be easily adjusted to fit any particular need or desired application.

Furthermore, the apparatus of this invention is compact, efficient, reusable, durable, rugged, is easily constructed, and is inexpensive and economical to manufacture. The present invention not only increases the speed and simplifies the procedure to manufacture novelty books, cards, and the other items listed above, it can do so for a fraction of the cost. Traditional and/or nontraditional card and/or book manufacturing machinery can be used to manufacture the apparatus of the present invention.

What is claimed is:

1. An apparatus comprising the combination of:
    (a) at least one generally planar primary sheet having an upper side and a reverse side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side and a reverse side, said strips being woven with said plurality of panels through said cuts, slits, or slots, woven combination of said primary sheet and said strips defining a woven mat, said mat having an upper side and a reverse side, said plurality of panels having creases, folds, or pleats therein positioned between adjacent strips, said upper side of said mat forming a first upper surface, said reverse side of said mat forming a first reverse surface;

(c) first indicia printed or appearing upon said upper side of said primary sheet or upon said upper side of said strips to form a message or object upon said first upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat;

(e) third indicia printed or appearing upon said reverse side of said primary sheet or upon said reverse side of said strips to form a message or object upon said reverse surface of said mat, said mat capable of forming a closed mountain fold on said reverse side of said mat between adjacent strips, said adjacent strips capable of being separated at or near an apex of said mountain fold on said reverse side of said mat to reveal a hidden reverse side of said mat; and (f) fourth indicia printed or appearing upon said hidden reverse side of said mat, said fourth indicia being generally hidden from view when said mat does not form said closed mountain fold on said reverse side of said mat or when said adjacent strips are not separated to reveal said hidden reverse side of said mat.

2. The apparatus of claim 1, wherein said primary sheet further has at least one selvage formed integrally with or secured to said warp.

3. The apparatus of claim 2, wherein said primary sheet has one or more creases, folds, or pleats therein positioned between said selvage and an adjacent strip.

4. The apparatus of claim 2, wherein said strips are operatively secured to said selvage.

5. The apparatus of claim 4, wherein said strips are operatively secured to said selvage by means of adhesive tape.

6. The apparatus of claim 4, wherein said strips have at least one tab or ear that is operatively secured to said selvage.

7. The apparatus of claim 6, further comprising means to secure said tab or ear to said selvage.

8. The apparatus of claim 2, further comprising a plurality of mats, each of said mats having a corresponding said selvage, plurality of said selvages being bound together to form a card or book.

9. The apparatus of claim 2, wherein said primary sheet has:

(a) a first selvage formed integrally with or secured to a first end of said warp; and (b) a second selvage formed integrally with or secured to a second end of said warp.

10. The apparatus of claim 2, further comprising a plurality of mats formed integrally with or joined together to form an accordion-style card or book.

11. The apparatus of claim 10, further comprising a slip cover into which said card or book may be inserted for storage.

12. An apparatus comprising the combination of:

(a) at least one generally planar primary sheet having an upper side and a reverse side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side and a reverse side, said strips being woven with said plurality of panels through said cuts, slits, or slots, woven combination of said primary sheet and said strips defining a woven mat, said mat having an upper side and a reverse side, said plurality of panels having creases, folds, or pleats therein positioned between adjacent strips, said upper side of said mat forming a first upper surface, said reverse side of said mat forming a first reverse surface;

(c) first indicia printed or appearing upon said upper side of said primary sheet or upon said upper side of said strips to form a message or object upon said first upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat;

(e) third indicia printed or appearing upon said reverse side of said primary sheet or upon said reverse side of said strips to form a message or object upon said reverse surface of said mat, said mat capable of forming a closed mountain fold on said reverse side of said mat between adjacent strips, said adjacent strips capable of being separated at or near an apex of said mountain fold on said reverse side of said mat to reveal a hidden reverse side of said mat;

(f) fourth indicia printed or appearing upon said hidden reverse side of said mat, said fourth indicia being generally hidden from view when said mat does not form said closed mountain fold on said reverse side of said mat or when said adjacent strips are not separated to reveal said hidden reverse side of said mat, said primary sheet having at least one selvage formed integrally with or secured to said warp;

(g) a plurality of mats formed integrally with or joined together to form an accordion-style card or book; and (h) a match-box style storage box into which said card or book may be inserted for storage.

13. An apparatus comprising the combination of:

(a) at least one generally planar primary sheet having an upper side and a reverse side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side and a reverse side, said strips being woven with said plurality of panels through said cuts, slits, or slots, woven combination of said primary sheet and said strips defining a woven mat, said mat having an upper side and a reverse side, said plurality of panels having creases, folds, or pleats therein positioned between adjacent strips, said upper side of said mat forming a first upper surface, said reverse side of said mat forming a first reverse surface;

(c) first indicia printed or appearing upon said upper side of said primary sheet or upon said upper side of said strips to form a message or object upon said first upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat;

(e) third indicia printed or appearing upon said reverse side of said primary sheet or upon said reverse side of said strips to form a message or object upon said reverse surface of said mat, said mat capable of forming a closed mountain fold on said reverse side of said mat between adjacent strips, said adjacent strips capable of being separated at or near an apex of said mountain fold on said reverse side of said mat to reveal a hidden reverse side of said mat;

(f) fourth indicia printed or appearing upon said hidden reverse side of said mat, said fourth indicia being generally hidden from view when said mat does not form said closed mountain fold on said reverse side of said mat or when said adjacent strips are not separated to reveal said hidden reverse side of said mat, said primary sheet having at least one selvage formed integrally with or secured to said warp;

(g) a plurality of mats formed integrally with or joined together to form an accordion-style card or book; and (h) means for selectively securing said accordion-style card or book in a closed position.

14. The apparatus of claim 13, wherein said securing means comprises one or more hook and loop fasteners.

15. An apparatus comprising the combination of:

(a) at least one generally planar primary sheet having an upper side and a reverse side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side and a reverse side, said strips being woven with said plurality of panels through said cuts, slits, or slots, woven combination of said primary sheet and said strips defining a woven mat, said mat having an upper side and a reverse side, said plurality of panels having creases, folds, or pleats therein positioned between adjacent strips, said upper side of said mat forming a first upper surface, said reverse side of said mat forming a first reverse surface;

(c) first indicia printed or appearing upon said upper side of said primary sheet and upon said upper side of said strips to form a message or object upon said first upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat;

(e) third indicia printed or appearing upon said reverse side of said primary sheet or upon said reverse side of said strips to form a message or object upon said reverse surface of said mat, said mat capable of forming a closed mountain fold on said reverse side of said mat between adjacent strips, said adjacent strips capable of being separated at or near an apex of said mountain fold on said reverse side of said mat to reveal a hidden reverse side of said mat; and (f) fourth indicia printed or appearing upon said hidden reverse side of said mat, said fourth indicia being generally hidden from view when said mat does not form said closed mountain fold on said reverse side of said mat or when said adjacent strips are not separated to reveal said hidden reverse side of said mat.

16. An apparatus comprising the combination of:

(a) at least one generally planar primary sheet having an upper side and a reverse side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side and a reverse side, said strips being woven with said plurality of panels through said cuts, slits, or slots, woven combination of said primary sheet and said strips defining a woven mat, said mat having an upper side and a reverse side, said plurality of panels having creases, folds, or pleats therein positioned between adjacent strips, said upper side of said mat forming a first upper surface, said reverse side of said mat forming a first reverse surface;

(c) first indicia printed or appearing upon said upper side of said primary sheet or upon said upper side of said strips to form a message or object upon said first upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat;

(e) third indicia printed or appearing upon said reverse side of said primary sheet and upon said reverse side of said strips to form a message or object upon said reverse surface of said mat, said mat capable of forming a closed mountain fold on said reverse side of said mat between adjacent strips, said adjacent strips capable of being separated at or near an apex of said mountain fold on said reverse side of said mat to reveal a hidden reverse side of said mat; and (f) fourth indicia printed or appearing upon said hidden reverse side of said mat, said fourth indicia being generally hidden from view when said mat does not form said closed mountain fold on said reverse side of said mat or when said adjacent strips are not separated to reveal said hidden reverse side of said mat.

17. The apparatus of claim 1, wherein said mat is capable of forming a closed portrait or landscape mountain fold between said adjacent strips.

18. An apparatus comprising the combination of:

(a) at least one generally planar primary sheet having an upper side and a reverse side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side and a reverse side, said strips being woven with said plurality of panels through said cuts, slits, or slots, woven combination of said primary sheet and said strips defining a woven mat, said mat having an upper side and a reverse side, said plurality of panels having creases, folds, or pleats therein positioned between adjacent strips, said upper side of said mat forming a first upper surface, said reverse side of said mat forming a first reverse surface;

(c) first indicia printed or appearing upon said upper side of said primary sheet or upon said upper side of said strips to form a message or object upon said first upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat;

(e) third indicia printed or appearing upon said reverse side of said primary sheet or upon said reverse side of said strips to form a message or object upon said reverse surface of said mat, said mat capable of forming a closed mountain fold on said reverse side of said mat between adjacent strip, said adjacent strips capable of being separated at or near an apex of said mountain fold on said reverse side of said mat to reveal a hidden reverse side of said mat;

(f) fourth indicia printed or appearing upon said hidden reverse side of said mat, said fourth indicia being generally hidden from view when said mat does not form said closed mountain fold on said reverse side of said mat or when said adjacent strips are not separated to reveal said hidden reverse side of said mat; and (g) means for initially and temporarily securing said apparatus in said first position to maintain the secrecy of said second indicia until said apparatus is moved to said second or third positions.

19. An apparatus comprising the combination of:

(a) at least one generally planar primary sheet having an upper side, said primary sheet having a plurality of cuts, slits, or slots therein to segment at least a portion of said primary sheet into a plurality of panels, said panels defining a warp;

(b) at least two generally planar strips of sheet material that define a weft, each strip having a corresponding upper side, said strips being woven with said plurality of panels through said cuts, slits, or slots, woven combination of said primary sheet and said strips defining a woven mat, said mat having an upper side, said plurality of panels having creases, folds, or pleats therein positioned between adjacent strips, said upper side of said mat forming an upper surface;

(c) first indicia printed or appearing upon said upper side of said primary sheet or upon said upper side of said strips to form a message or object upon said upper surface of said mat, said mat capable of forming a closed mountain fold on said upper side of said mat between adjacent strips, said adjacent strips capable of being separated at or near an apex of said mountain fold on said upper side of said mat to reveal a hidden upper side of said mat;

(d) second indicia printed or appearing upon said hidden upper side of said mat, said second indicia being generally hidden from view when said mat does not form said closed mountain fold on said upper side of said mat or when said adjacent strips are not separated to reveal said hidden upper side of said mat, said primary sheet having at least one selvage formed integrally with or secured to said warp; and (e) wherein a plurality of said mats are formed integrally with or joined together to form a card or book.

20. The apparatus of claim 19, wherein said plurality of said mats are joined together to form an accordion-style card or book.

21. The apparatus of claim 19, wherein said strips are operatively secured to said selvage.

* * * * *